United States Patent [19]

Quaint

[11] 4,327,467
[45] May 4, 1982

[54] INFLATED SHELL STRUCTURE FOR CURING OR EMBOSSING ROLLER

[75] Inventor: Glenn W. Quaint, Cuyahoga Falls, Ohio

[73] Assignee: Goodyear Aerospace Corporation, Akron, Ohio

[21] Appl. No.: 153,349

[22] Filed: May 27, 1980

[51] Int. Cl.³ .............................................. B21B 13/02
[52] U.S. Cl. .................................... 29/113 R; 29/128; 29/131
[58] Field of Search ..................... 29/113 R, 128, 130, 29/131, 132, 110

[56] References Cited

U.S. PATENT DOCUMENTS

| | | | |
|---|---|---|---|
| 689,590 | 12/1901 | Johnson et al. | 29/113 R |
| 1,226,984 | 5/1917 | Muskett | 29/113 R |
| 1,277,995 | 9/1918 | Muskett | 29/113 R |
| 2,157,440 | 5/1939 | Streckfus et al. | 29/130 X |
| 2,369,635 | 2/1945 | Bacon | 29/130 |
| 3,707,749 | 1/1973 | Henley | 29/113 R |

Primary Examiner—Peter P. Nerbun
Attorney, Agent, or Firm—P. E. Milliken; E. W. Oldham; R. L. Weber

[57] ABSTRACT

An inflated shell structure for a curing, embossing, or film winding nip roller having a rubber cover. Fundamentally, the invention includes a mandrel about which a rubber tube is spirally wound. Adhesively secured to the tube and about the mandrel is a bridge composite of plural layers, at least one of which is axially aligned with respect to the mandrel, and at least one of which is circumferentially aligned. Over the bridge network there is maintained a thin rubber cover having a thickness on the order of 0.250–1.0 inch. The tubing can be inflated under a source of gas pressure to give the roll a physical structure of rigidity and consistency. When used as a nip or bonder roller, the forces imparted to the roller are dissipated through the bridge assembly and the inflated tube, greatly limiting the amount of heat generated in the rubber cover.

11 Claims, 4 Drawing Figures

INFLATED SHELL STRUCTURE FOR CURING OR EMBOSSING ROLLER

BACKGROUND ART

The invention herein resides in the art of industrial rollers of the type traditionally used for bonding, embossing, curing, or providing a nip to assist in wrapping a web of material about a roll. Prior art industrial rollers of this nature have generally consisted of a steel drum having wrapped thereabout a large solid rubber cover with the cover having a thickness as great as four inches. This roller with the solid rubber cover was typically used as the driven wheel in a roll bight with the web of material passing through the bight being processed as by being bonded, embossed, cured, or the like. In most operations, the roll bight was effectuated by forceful engagement between two rolls, one of which had thereabout the thick solid rubber cover. With such pressure engagement, the rubber cover would tend to flex under compression of the roll bight and, due to the hysteresis effect of the compression and recovery of the rubber, enormous amounts of heat were generated. Such heat would cause the rubber cover to age, crack, and deteriorate rapidly. To prevent such effect on the rubber cover, the roll bight would typically be used at low speeds or external cooling equipment would be used to dissipate the heat generated in the flexing rubber cover. Of course, low operating speeds are undesirable from a manufacturing standpoint, and external cooling equipment adds to both initial and maintenance costs.

Solid rubber covers are also used in winding thin films. In this application the nip roll serves to control the amount of air trapped between wraps. If a solid rubber nip roll cover is soft enough to produce an adequate contact area on the film surface, it often tends to stretch and squirm. With some films this produces loads which cause the product to walk off the wind-up roll.

A number of approaches have been taken to eliminate or significantly reduce the heat generated in the prior art structures. Prior art known to applicant which generally relate to the inventive structure presented hereinafter consists of U.S. Pat. Nos. 689,590; 1,277,995; 3,098,284; 3,253,323; 3,295,188; 3,394,902; 3,460,221; and 3,937,412. Additionally, Canadian Pat. Nos. 653,299; 654,990; 866,062; and 866,063, are also of general interest. A review of the structures of these patents evidences the fact that the art is still void of an industrial roller which is extremely durable in operation while providing a footprint at the roll bight which effects a smooth and uniform forceful engagement with the material being processed.

DISCLOSURE OF INVENTION

In light of the foregoing, it is an object of a first aspect of the invention to provide an inflated shell structure for a curing or embossing roller wherein the deteriorating hysteresis effects of prior art rubber covers are eliminated.

An object of another aspect of the invention is to provide an inflated shell structure for a curing or embossing roller wherein the effective compression of the roller cover is minimized.

Still another object of an aspect of the invention is to provide an inflated shell structure for a curing or embossing roller which is capable of operating at higher speeds and temperatures than heretofore in the art, being able to withstand contact with a backup roller emitting steam or the like.

A further object of an aspect of the invention is to provide an inflated shell structure for a curing or embossing roller wherein means for dissipating force are maintained beneath the roller cover to dissipate energy over the entire area of the drum while providing an improved operative footprint.

An additional object of an aspect of the invention is to provide an inflated shell structure for a curing, embossing, or film wind-up nip roller wherein stretching and squirming of the cover material in the nip is eliminated.

Yet a further object of an aspect of the invention is to provide a nip roller wherein the cover coating friction coefficient is low enough to permit the cover to slip against, rather than grab onto, the film as it passes through the nip.

Another object of an aspect of the invention is to provide an inflated shell structure for a curing or embossing roller which is durable and reliable in operation, while being simplistic in design and relatively inexpensive in construction.

The foregoing and other objects of the invention which will become apparent as the detailed description proceeds are achieved by an industrial roller assembly, comprising: a mandrel; a tube spirally wound about said mandrel; inflation means operatively connected to said tube for inflating and maintaining said tube under pressure; and a rubber cover positioned over and in compressive contacting engagement with said tube.

BRIEF DESCRIPTION OF DRAWINGS

For a complete understanding of the objects, techniques, and structure of the invention, reference should be had to the following detailed description and accompanying drawings wherein.

BEST MODE FOR CARRYING OUT THE INVENTION

Figure 1:
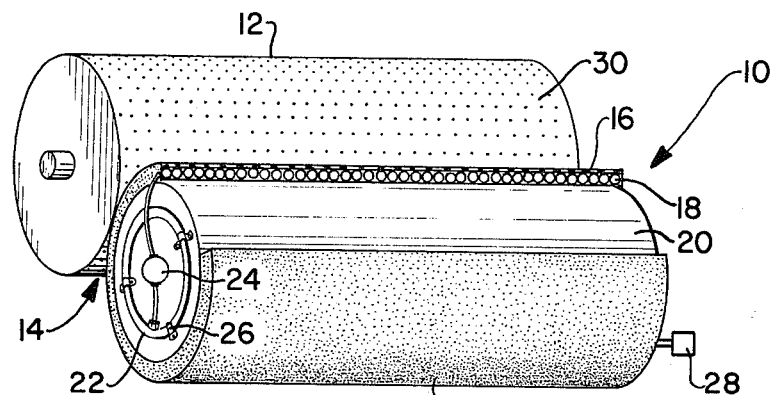
FIG. 1 is an illustrative view of a steel drive roll in engagement with the inflatable roll of the invention, the latter shown in partial sectional view.

Referring now to the drawings and more particularly to FIG. 1, it can be seen that a driven roller made in accordance with the instant invention is designated generally by the numeral 10. A drive roller 12 is shown in contacting engagement with the roller 10 with the area of contact therebetween being defined as a roll nip or bight 14. As will be understood by those skilled in the art, the bight 14 may be defined by a forceful engagement between the rollers 10, 12. This engagement is achieved by means for effectuating a load, with the roller 12 being driven by an engine, motor, or the like, to effect movement of the processed material through the bight. It will be understood that in some configurations of use, the roll 10 may rest upon a wind-up roll with the only load at the nip being that imparted by the weight of the roll 10 itself.

With further reference to FIG. 1, it will be seen that the roller 10 includes a multi-layered cover 16, to be discussed hereinafter, which provides the outer cover for making contacting engagement with the material processed at the bight 14. The cover 16 encompasses an inflatable tube or hose 18 which is spirally wrapped about a steel mandrel or drum 20. The tube or hose 18 is preferably of a Nylon fabric construction, coated with Neoprene. Such construction gives the tube substantial strength to deform and recover in the roll bight while being sealed and air-impervious. A toroidal reservoir 22 is received within the mandrel 20 and maintains therein gas, under pressure, for communication with the spirally wound tubing 18 through a regulator valve 24. The valve 24, set by an operator, meters the gas from the reservoir 22 to the tubing 18 to maintain the same at a constant predefined pressure. As shown, clips 26 are provided for maintaining the reservoir within the mandrel 20, while a relief valve 28 is provided for safety purposes. It is presented that the element 28 could also comprise a recirculating pump to communicate gas from the tubing 18 back to the reservoir 22. Of course, the inflation pressure for the tubing 18 will vary according to use and the desired roll stiffness.

With final attention to FIG. 1, it will be noted that the drive roller 12 is shown to be characterized by a plurality of holes 30 therein. It is proposed that the roller 12 may communicate with a source of steam pressure or the like such that the holes 30 emit steam to the roll bight 14. In certain applications, such as when the assembly of FIG. 1 is used as a bonder roll configuration, such steam may be most desirable. The structure of the roll 10, to be elaborated upon hereinafter, allows such usage since little heat is generated by flexing of the cover 16 at the bight 14. Prior art roller covers, generating tremendous heat by flexing at the bight, are not adaptable for use with a steam-emitting drive roll as shown in FIG. 1.

Figure 2:
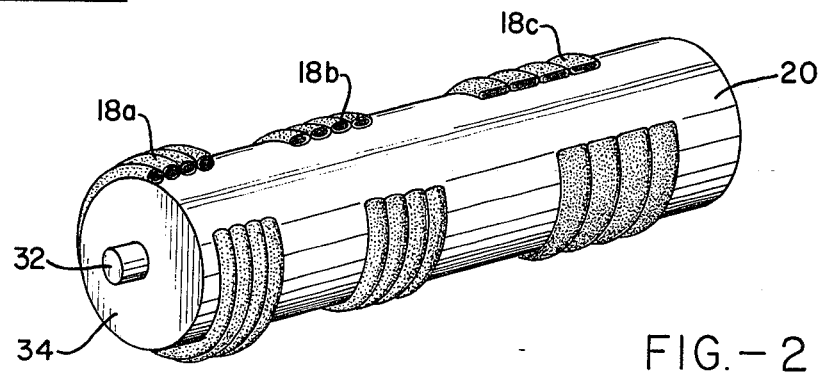
FIG. 2 is a partial sectional view of the mandrel of the inflatable roll of the invention, showing the same receiving spirally wrapped pressure tubes thereabout.

FIG. 2 illustrates the geometrical cross-sectional configuration of the tubing 18 in various points of construction and use. When spherically wrapped about the mandrel 20, the tubing 18 is of circular cross-section, designated as 18a. When the cover 16 is placed over the spirally wrapped tubing 18, the tubing takes on an elliptical cross-section, designated at 18b. Finally, when brought into compressive engagement as at the roll bight 14, the tubing 18 takes on a substantially rectangular cross-section, as shown at 18c. The rectangular cross-section provides a smooth, continuous, and uniform footprint across the bight 14 while withstanding the force imparted thereto by the drive roller 12. With final attention to FIG. 2, it will be noted that a spindle or axle 32 extends from an end plate 34 for purposes of rotatable mounting of the roller 10.

Figure 3:
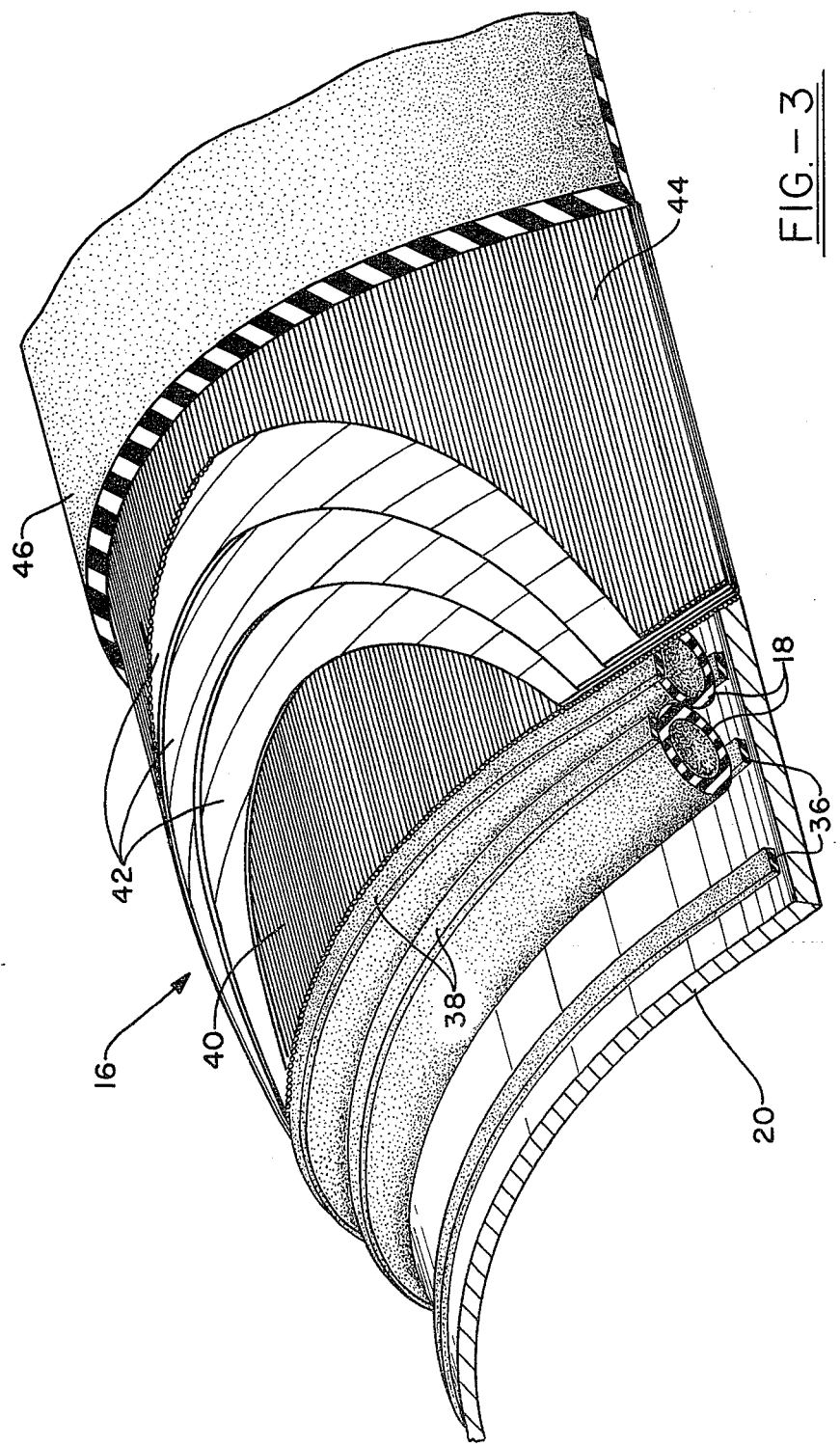
FIG. 3 is a sectional view of the mandrel and layers of the roll cover of the invention.

The specific structure of the inflatable roll cover of the invention is illustrated in FIG. 3. As shown, a bond strip 36, covered on both sides thereof with an adhesive material, is spirally wrapped about the mandrel 20. The adhesive bonds the strip 36 to the mandrel 20 on the bottom thereof, while adhesively receiving and maintaining the tube 18 on the top thereof. A second bond strip 38, identical to the strip 36 is then wrapped around and adhesively attached to the top circumferential edge of the tubing 18 as shown. Attached to the bond strip 38 is a bridge composite 40–44. The first layer of the bridge comprises an array of axial wire cords 40 adhesively attached to the bond strip 38. A plurality of circumferential wraps 42 of cloth, Kevlar, or other suitable tire cord material are then wrapped over the axial wire 40, as illustrated. Finally, a last layer of axial wires 44 are positioned over the circumferential wrap 42. The bridge just described is adhesively held together by the provision of a gum Neoprene on each side of each layer thereof. Finally, a layer of soft rubber is provided over the layer of axial wires 44 to provide a surface of contacting the material being processed by the roll 10.

Utilizing the structure just described, it has been found that the cover composite 16 may be of a very thin, flexible, and durable nature. Indeed, the overall thickness of the cover just described is approximately 0.610 inch. The wires of the layers 40,44 have a diameter of 0.080 inch, while the circumferential wrap layers 42 and the bond strip 38 each have a thickness of 0.050 inch. The thickness of the soft rubber cover 46 is accordingly 0.250 inch, substantially thinner than the covers of previously known industrial rollers, and accordingly unaffected by the hysteresis heat generation of previously known covers. Indeed, the cover composite 16 functions in much the same manner as an automobile tire with the forces imparted thereto being dissipated by the bridge 40–44 and tubes 18 over the entire circumference of the roller 10. With respect to the construction of the preferred embodiment of the invention, it should be noted that the tubing 18 is preferably wrapped on a spiral of approximately 9°.

The axial bridge layers 40,44 form a structure which maintains uniform pressure across the width of the roll. The radial wraps 42, being of low-elongation cord, will not stretch while passing through the nip. Especially when used as a nip roller, a coating may be placed on the rubber cover 46 to reduce the coefficient of friction thereof so that the film may slip on the roller. A suitable coating is Chemlok 305, two-part liquid epoxy.

Figure 4:
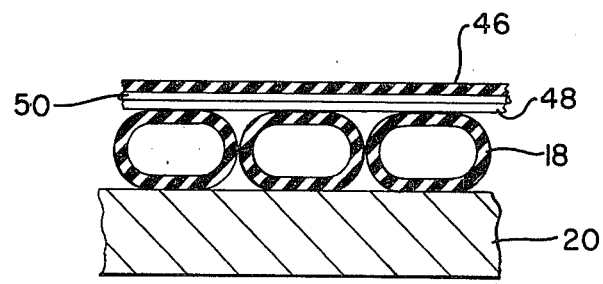
FIG. 4 is a sectional view of an alternate embodiment of the roller cover of the invention.

An alternate embodiment of the cover of the invention is illustrated in cross-section in FIG. 4. As shown, the mandrel 20 again receives spirally wrapped tubing 18 thereabout. In this case, however, only two wraps of Kevlar are used as the cord material. A first axial wrap 48 is provided in adhered relationship with the tubing 18, while a radial or spool wrap 50 is then provided thereover. The soft rubber cover 46 is identical to that of the embodiment of FIG. 3. It has been found that the orthogonal positioning of the Kevlar wraps 48,50 achieves substantially the same operative characteristics as the embodiment of FIG. 3, while having yet further reduced overall thickness.

The covers of the industrial rollers just described are sturdy, yet flexible. Further, the thin rubber cover utilized as the outer layer of the roller assembly is not affected by the heat generated via the hysteresis flexing of the rubber experienced in prior art embodiments. Whether used as a bonder roller for adhering two layers together, an embossing roller, or merely a nip roller to assist in the winding up of a web, the industrial roller of the invention may be operated at high speed and in environments of high temperature without deteriorating effects on the cover.

While in accordance with the patent statutes only the best mode and preferred embodiments of the invention have been presented and described in detail, the invention is not limited thereto or thereby. Accordingly, for an appreciation of the true scope and breadth of the invention, reference should be had to the following claims.

What is claimed is:
1. An industrial roller assembly, comprising:
a mandrel;
a flexible tube spirally wound about said mandrel;

inflation means operatively connected to said tube for inflating and maintaining said tube under pressure;

a rubber cover positioned over and in compressive contacting engagement with said tube; and further including a first force-absorbing material axially wrapped about said mandrel and a second force-absorbing material circumferentially wrapped about said mandrel, said first material comprising first and second layers of wire and said second material comprising a cloth, said cloth being interposed between said first and second layers.

2. The industrial roller according to claim 1 wherein said tube is of a polyamide construction and covered with a polychloroprene.

3. The industrial roller according to claim 2 wherein said tube is adhesively adhered to said mandrel and said first layer of wire is adhesively adhered to said tube.

4. The industrial roller according to claim 1 wherein said cloth is of a polyaramid construction.

5. The industrial roller according to claim 1 wherein said tube is of circular cross-section, deformed to an elliptical cross-section by said cover.

6. An industrial roller for use as a nip or bonder roller, comprising:

a mandrel;

a continuous flexible tube spirally wrapped about said mandrel;

a source of gas pressure connected to said tube and maintaining said tube under pressure;

a bridge composite of force-absorbing materials wrapped about said tube;

a resilient cover maintained over said bridge; and wherein said tube is deformed from a circular to an elliptical cross-section by said bridge composite.

7. The industrial roller according to claim 6 wherein said bridge composite comprises a first layer of material axially maintained upon said mandrel and a second layer of material circumferentially maintained upon said mandrel.

8. The industrial roller according to claim 6 wherein said material in both said layers comprises a polyaramid.

9. The industrial roller according to claim 6 which includes a third layer of material, said first and third layers comprising wires axially maintained upon said mandrel and wherein said second layer is maintained between said first and third layers.

10. The industrial roller according to claim 9 wherein said second layer is of a polyaramid construction.

11. The industrial roller according to claim 6 wherein said resilient cover is of rubber construction, having a thickness of approximately 0.250 inch.

* * * * *